3,180,133
METHOD AND APPARATUS FOR DETERMINING PERMEABILITY
Habib S. Rahme, Long Island, N.Y., assignor to The Pure Oil Company, Chicago, Ill., a corporation of Ohio
Filed Aug. 23, 1962, Ser. No. 218,893
12 Claims. (Cl. 73—38)

This invention relates to the measurement of flow characteristics in porous specimens and more particularly to the evaluation of the permeability of porous-earth formations by measuring the radial flow of a test gas into a cylindrical core under a changing pressure differential.

It is often desirable to have knowledge of flow characteristics in earth strata to solve well-production problems concerning secondary recovery, pressure maintenance, and proper evaluation of recoverable reserves. This information is obtained by determining the permeabilities of core samples obtained from the formations. It is essential that the permeability measurements of the core samples accurately reflect the actual flow conditions within the earth strata to be of value. The cores obtained by the usual methods utilized in coring are cylindrical with the axis perpendicular to the direction of flow in the earth strata.

Heretofore, the methods of measuring the permeabilities of cores to fluids have not accurately reflected the actual flow conditions within the earth strata. The prior art method of determining the permeability of a core by flowing a test fluid axially through the core, that is, in a direction perpendicular to the direction of flow in the formation, is unsatisfactory since the formations from which the cores are obtained are frequently heterogeneous and permeability determinations made by axial-flow techniques may be misleading. Even if the core is homogeneous, it is difficult to apply axial-flow results to estimate the flow properties of the formations surrounding the well bore in a substantially planar, radial direction.

The prior art has recognized the desirability of making permeability determinations in a direction parallel to the bedding plane of the core before it is removed from the formation. This has been accomplished by cutting from the core a cylindrical plug having an axis perpendicular to that of the core and flowing the test fluid axially through the plug, but this method is also unsatisfactory. While whole cores are usually large enough to account for local inhomogeneities, shale streaks, or the like, it is quite likely that specimen plugs having appreciably different permeabilities can be cut from one heterogeneous core in view of the significant reduction in the effective volume of these specimens. In addition, while the flow through the specimen is in the same direction as within the earth strata, it is still not in a radial direction.

This invention is directed to an apparatus and method for determining the permeabilities of cylindrical porous specimens. Briefly, the apparatus of this invention comprises a fluid-tight core holder adapted to hold a core in such a manner as to permit radial entry of fluid into the core. The core holder, which includes means for indicating the pressure thereof, at any time during the test, is connected by a valve-controlled conduit to a gas chamber adapted to contain a gas at a pressure greater than the pressure in the core holder. The apparatus also includes a substantially fluid-impermeable member having substantially the same volume and shape of the core specimen.

In my invention, the permeability of the large core, as obtained from the formation, is determined by placing the core in the core holder maintained at a first known pressure. The core holder is then placed in communication with the gas chamber containing a gas at a second known pressure which is greater than the pressure in the core holder, thereby causing the gas to expand into the core holder and radially enter the core specimen. The pressure in the core holder is measured at a plurality of instants during the expansion of the gas, which is allowed to continue until the pressures in the core holder and gas chamber are substantially equalized. Then, the core is removed from the core holder and replaced with a substantially fluid-impermeable member having substantially the same volume and shape as the core specimen. The described procedure is then repeated, utilizing the same initial pressures in the core holder and gas chamber, and the permeability of the core is calculated from the pressure measurements. Since the test is conducted under radial flow in a large core in the same direction as in the reservoir, more accurate permeability determinations are obtained than by the utilization of prior art techniques.

It is an object of this invention to provide an apparatus and method for measuring the flow characteristics of a porous specimen. Another object of this invention is to provide an apparatus and method for measuring the permeability of a full-diameter core as originally obtained from a subterranean formation. Still another object of this invention is to provide an apparatus and method for determining the permeability of a core sampled from an earth stratum under conditions which accurately reflect the actual flow conditions within the earth stratum. A further object of this invention is to provide an apparatus and method for determining the permability of a core by measuring the radial flow of a test fluid into the core under a changing pressure differential. These and further objects of this invention will become apparent or be described as the description herein proceeds.

The invention is best described with reference to the drawings in which.

Figure 1:
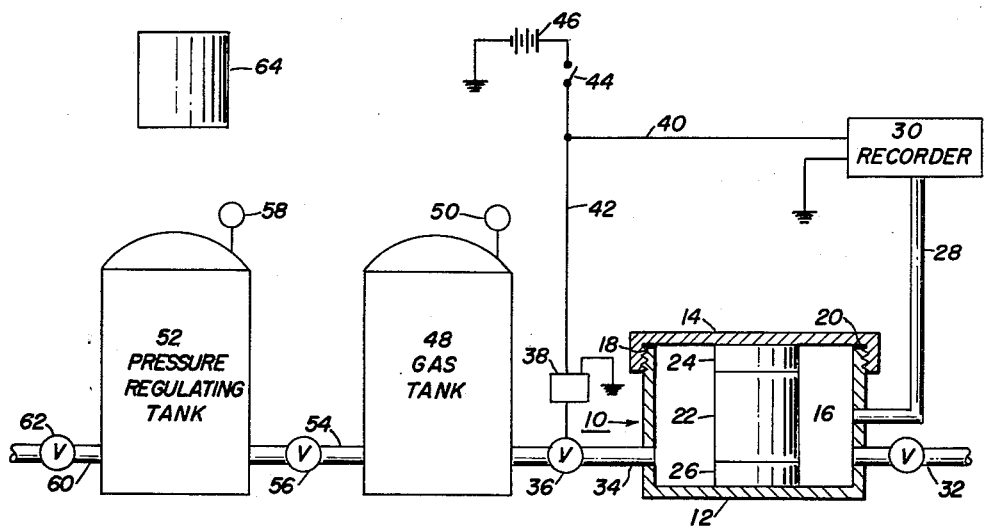
FIGURE 1 is a diagrammatic view, partially in section, of the apparatus of this invention.

Referring to FIGURE 1, the numeral 10 designates a core holder which includes cup-shaped bottom and sidewall portion 12 and closure 14 defining core-sample chamber 16. Cup-shaped portion 12 and closure 14 are secured together by means of threads 18. A seal 20 is provided to make the chamber 16 fluid tight. Disposed within chamber 16 is core 22. Since core 22 is cylindrical in shape, chamber 16 is preferably also cylindrical. Two resilient disc-shaped spacers 24 and 26 are provided adjacent to the upper and lower flat ends of core 22. Resilient spacers 24 and 26 are preferably fabricated of a material which is impervious to the test gas to be used to determine the porosity of specimen 22, and are sufficiently resilient to provide an effective seal for the upper and lower flat surfaces of specimen 22. It is evident that as closure 14 is screwed in place to close chamber 16, resilient spacers 24 and 26 cooperate to provide means for supporting core 22. In this manner the core 22 is held rigidly in place without interfering with the entry of the test gas into the peripheral surfaces thereof.

Communicating with chamber 16 is conduit 28 which, in turn, leads to recording means 30 for recording the pressure in chamber 16 during the permeability measurements. An example of a suitable pressure recording means comprises a Bourdon tube placed in a bath filled with a petroleum oil, such as a 70 c.p.s. viscosity petroleum oil, communicating with conduit 28 and connected by suitable electrical control means to an apparatus for measuring pressure versus time. A suitable recording apparatus is a Visicorder (906-Oscillograph), model 906A16800H, manufactured by the Minneapolis-Honeywell Regulator Co.

Also communicating with chamber 16 are valve-controlled conduits 32 and 34 which are respectively used for evacuating chamber 16 prior to the permeability measurement, if so desired, and supplying the test gas to chamber 16. In order to obtain accurate permeability measurements, it is preferred that valve 36 controlling conduit 34 be a relatively quick-opening valve and recorder 30 be activated at the time the valve 36 is opened. One form which the apparatus may take is to have valve 36 operated by solenoid 38, and recorder 30 and solenoid 38 connected in circuit by leads 40 and 42, respectively, with switch 44 and battery 46. It will be evident that the closing of switch 44 activates recorder 30, as well as solenoid 38 to open valve 36.

The test gas is supplied to chamber 16 through conduit 34 by gas tank 48 provided with pressure gauge 50. Gas tank 48, in turn, communicates with pressure regulating tank 52 through conduit 54 which is controlled by valve 56. Pressure regulating tank 52 is provided with pressure gauge 58. Pressure regulating tank 52 is connected to a source of pressurized test gas by conduit 60 controlled by valve 62.

The numeral 64 depicts the substantially fluid-impermeable member having substantially the same shape as the core to be tested for permeability. It is essential that member 64 have substantially the same volume as core specimen 22. Member 64 can be made of a metallic material such as aluminum. If pressure measurements are made using core 22 in chamber 16 before member 64 is used, member 64 can be core 22 with the outer surfaces thereof coated with a substantially fluid-impermeable material.

To illustrate the utilization of the instant invention in its application, any occluded fluids within the porous structure of core specimen 22, such as crude oil, can be removed by flushing core 22 with a solvent adapted to remove the occluded fluids, such as acetone in the case of crude oil, and then evacuating core 22 to remove the solvent. Core specimen 22 is then placed in chamber 16 with the flat ends of core 22 sealed against fluid flow to prevent entry of the test gas through these surfaces. Although this is accomplished by supporting core specimen 22 between resilient discs 24 and 26, as depicted in FIGURE 1, the flat surfaces of specimen 22 may also be coated with a thin layer of fluid-impervious material, such as varnish, shellac, polyfluoroethylenes, etc., if so desired. Closure 14 is screwed thighly in place so that resilient discs 24 and 26 support test specimen 22, and so that seal 20 is compressed to prevent leakage. Although it is not essential, chamber 16 can be evacuated prior to the start of the test by a vacuum pump connected to valve-controlled conduit 32, if so desired. With valves 36 and 56 closed, valve 62 is opened to admit a pressurized test gas, such as air, to pressure regulating tank 52 through conduit 60. After suitable pressure has built up in pressure regulating tank 52, valve 62 is closed and valve 56 is opened until the pressure in gas tank 48 is built up to a suitable value so that the pressure in chamber 16 reaches at least a preselected test pressure. For example, the pressure in gas tank 48 is built up to 60 p.s.i.g. when a maximum test pressure of 50 p.s.i.g. is utilized in chamber 16. With the pressures in chamber 16 and gas tank 48 established, simultaneously valve 36 is opened and recorder 30 is turned on. This is accomplished by closing switch 44 in the apparatus depicted in FIGURE 1. The opening of valve 36 permits the test gas to flow from gas tank 48 through conduit 34 to core-sample chamber 16 where it radially enters core 22. At the same time, recorder 30 registers the pressure build up in core sample chamber 16 from the initial pressure therein.

Figure 2:
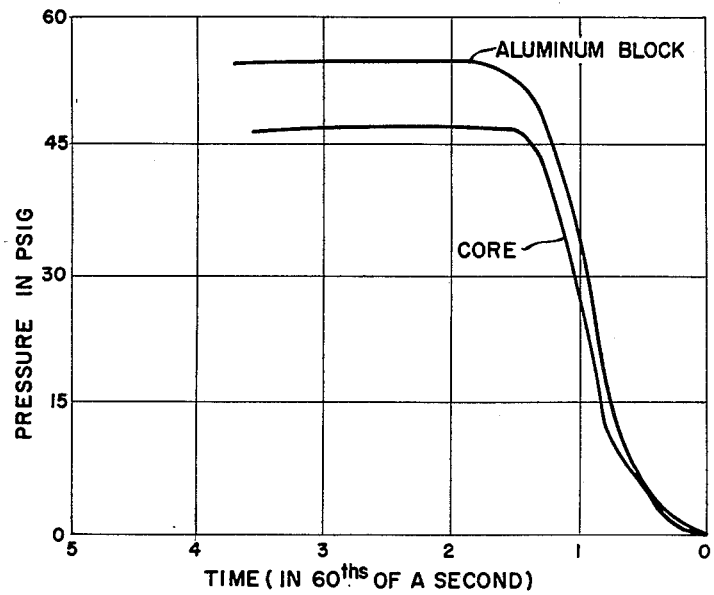
FIGURE 2 is a graph depicting typical measurements of pressure in the core holder.

Then, switch 44 is opened to close valve 36 and shut off recorder 30, and core 22 is removed from chamber 16 and replaced with impermeable member 64 between resilient discs 24 and 26. It will be evident that resilient discs 24 and 26 can be omitted if impermeable member 64 has the same total volume as resilient discs 24 and 26 and core 22. With lid 14 in place and valve 36 closed, the pressure in chamber 16 is adjusted through valve-controlled conduit 32, if necessary, to establish the same initial pressure therein as in the run using core 22. The same initial pressure, 60 p.s.i.g. is established in gas tank 48 in the manner previously described. Switch 44 is again closed to simultaneously open valve 36 and start recorder 30. A representative graph of the pressure build up in core-sample chamber 16 versus time utilizing a permeable core and an impermeable member obtained by this invention is shown in FIGURE 2.

To calculate the permeability of a core by this method, the following steps are taken:

(1) Measure the pressure build up in the core holder containing a core specimen as described, (2) Measure the pressure build up in the core holder containing an impermeable member having the same volume as the core tested, as described above, (3) At any time "$t$" read the recorder chart for the difference between the pressures determined in steps (1) and (2), (4) Read the recorder chart after the system has reached equilibrium and determine the difference in the pressures in steps (1) and (2), (5) Determine the ratio $V_t/V_T$ by dividing the differences in pressures determined in steps (3) by (4), (6) Obtain Z by the following equation $$Z = \sqrt{1-(1-\alpha)V_t/V_T}$$

(7) Evaluate $$\int_0^t Pu \, dt$$

from the pressure build up curve, and calculate the permeability of the core by means of the relation $$k = \frac{a^2 \mu \rho}{\int_0^t Pu \, dt} \cdot \frac{\int_Z^{1.0} Z^3 \ln(1/Z) \, dZ}{Z^2 - \alpha}$$

and (8) If $P_{cf}$ is different from $P_{ct}$ multiply the value obtained in step (5) by $P_{cf}/P_{ct}$ to obtain the correct $V_t/V_T$ where:

$k$ is the permeability of the sample in darcies, $a$ is the radius of the sample in centimeters, $u$ is the viscosity of the test fluid in centipoises, $t$ is the time in seconds, $Z$ is the ratio of the radius of the uninvaded part of the core to the total radius of the core, $V_t$ is the volume of gas that entered the core up to time $t$, $V_T$ is the maximum volume of gas entering the core under the applied pressure, $P_o$ is the original pressure in the core, expressed in atmospheres, $Pu$ is the pressure build up in the core holder, expressed in atmospheres, $\alpha$ is $P_o/Pu$, $P_{ct}$ is the pressure, expressed in atmospheres, in the core holder at time $t$ when the core is in the core holder, and $P_{cf}$ is the final pressure, expressed in atmospheres, in the core holder at time infinity.

Figure 3:
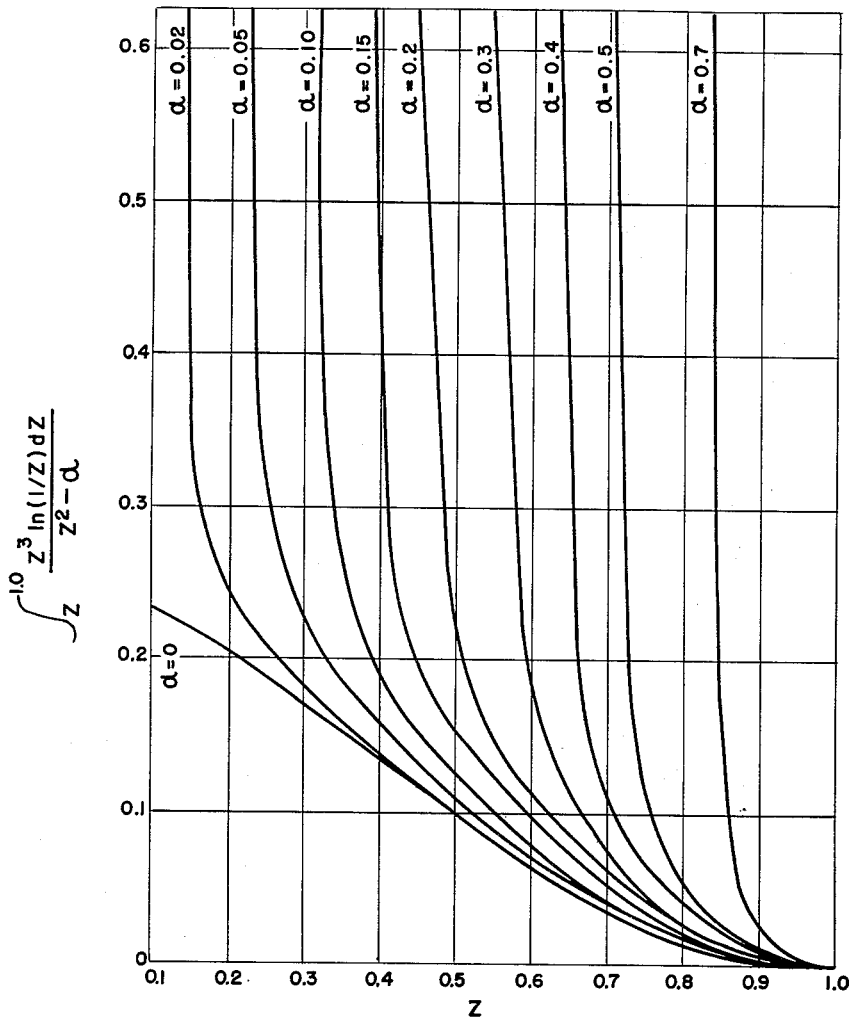
FIGURE 3 is a graph which may be used to avoid time-consuming calculations in determining the permeability of a core.

Since the evaluation of the above integral, $$\frac{\int_Z^{1.0} Z^3 \ln(1/Z) \, dZ}{Z^2 - \alpha}$$

involves time-consuming calculations, a graph showing different values of the integral can be used with this invention. A graph in which the integral has been evaluated for numerous values of $\alpha$ and $Z$ is shown in FIGURE 3.

In order to demonstrate the reliability of this invention in evaluating the permeability of large cores, the permeabilities of five large homogeneous Berea cores approximately 3.5 inches diameter by 4 inches long, were determined as hereinbefore described by letting air flow radially into these cores at an applied upstream pressure equal to 60 p.s.i.g. The permeabilities thus obtained were then compared with the permeabilities of two plugs approximately 1.5 inches diameter by 2 inches long cut from each of the cores. The results are shown in Table I.

*Table I*

| Core Number | | Permeabilities of Plugs in Millidarcies | Permeabilities of Whole Cores in Millidarcies |
|---|---|---|---|
| 1 | A | 184 | 192 |
|   | B | 180 |   |
| 2 | A | 33  | 67.5 |
|   | B | 90  |   |
| 3 | A | 84  | 84 |
|   | B | 79.5 |   |
| 4 | A | 123 | 107 |
|   | B | 95  |   |
| 5 | A | 150 | 149 |
|   | B | 157 |   |

These data show very good agreement between the permeability of the large core and the permeabilities of the corresponding plugs. Occasionally, e.g., cores 2 and 4, the permeability of the large core appears to be an average of the permeabilities of the plugs. In this respect, the method offers the advantage that fewer measurements are needed to obtain a reliable value for permeability.

The use of large cores to determine the permeability of a formation is especially advantageous in heterogeneous media. With a volume of about 100 times the volume of a plug, a large core has a greater chance to represent the heterogeneity of the formation than a plug. Therefore, a more reliable result can be expected if the permeability of the formation is obtained using a large core. In order to demonstrate the heterogeneous nature of some reservoir rocks, permeability measurements were made of heterogeneous cores and plugs cut from the cores as hereinbefore described in connection with the homogeneous cores. The heterogeneous nature of these reservoir rocks is indicated by the differences between the permeabilities of various plugs cut from the same core as shown in Table II.

*Table II*

| Core Number | | Permeabilities of Plugs in Millidarcies | Permeabilities of Whole Cores in Millidarcies |
|---|---|---|---|
| 6  | A | 146   | 149 |
|    | B | 454   |     |
| 7  | A | 287   | 320 |
|    | B | 350   |     |
| 8  | A | 126   | 143 |
|    | B | 217   |     |
|    | C | 25    |     |
| 9  | A | 0.5   | 0.76 |
|    | B | <0.1  |     |
| 10 | A | <0.1  | <0.1 |
|    | B | <0.1  |     |
|    | C | <0.1  |     |
| 11 | A | 0.1   | 0.3 |
|    | B | 1.2   |     |
|    | C | 0.5   |     |
| 12 | A | 75    | 87.5 |
|    | B | 111   |     |
| 13 | A | 0.35  | 2.1 |
| 14 | A | 24.2  | 2.6 |
| 15 | A | 0.16  | 2.15 |

Although the invention has been described in relation to a specific embodiment, it will be apparent that various modifications can be made by one skilled in the art without departure from the intended scope of this invention. It will be apparent that the pressure measurements can be made with impermeable member in the core holder before the permeability measurements are made with the core in the core holder. Various test gases may be used, including air, gaseous hydrocarbons such as methane, carbon dioxide, helium, hydrogen, and the like. It will be apparent that the test gas is preferably non-reactive with materials contained with the core.

The embodiments of this invention in which an exclusive property or privilege is claimed are defined as follows:

1. The method of determining the permeability of a cylindrical, porous specimen comprising obtaining pressure measurements by
    (1) placing said specimen in a first closed zone at a first known pressure with the flat ends of said specimen sealed against fluid flow,
    (2) placing said first closed zone in communication with a second closed zone containing a gas at a second known pressure which is greater than said first known pressure,
    (3) expanding the gas from said second closed zone into said first closed zone until the pressures in both zones are substantially equalized, and
    (4) measuring the pressure in said first closed zone at a plurality of instants during the expansion of said gas; and
    (5) placing a substantially fluid-impermeable member in said first closed zone at said first known pressure, said fluid-impermeable member having substantially the same volume and shape as said specimen,
    (6) placing said first closed zone in communication with said second closed zone containing said gas at said second known pressure,
    (7) expanding the gas from said second closed zone into said first closed zone until the pressures in both zones are substantially equalized, and
    (8) measuring the pressure in said first closed zone at a plurality of instants during the expansion of said gas; and
    (9) from said pressure measurements calculating the permeability of said specimen.

2. The method in accordance with claim 1 in which the flat ends of said specimen are sealed with a substantially fluid-impermeable material before said specimen is placed in said first closed zone.

3. The method in accordance with claim 1 in which said specimen is supported in said first closed zone by substantially resilient fluid-impermeable elements engaging the flat ends thereof.

4. The method in accordance with claim 3 in which said fluid-impermeable member is supported in said first closed zone by substantially resilient fluid-impermeable elements engaging the flat ends thereof.

5. The method in accordance with claim 1 which includes evacuating said first closed zone before said second closed zone is placed in communication therewith to remove substantially all gas from said first closed zone.

6. The method in accordance with claim 1 in which the said substantially fluid-impermeable member is metallic.

7. The method in accordance with claim 1 in which said fluid-impermeable member is said specimen with the outer surfaces thereof sealed with a substantially fluid-impermeable material.

8. The method in accordance with claim 1 which includes removing occluded fluids from said specimen before said specimen is placed in first closed zone by flushing said specimen with a solvent adapted to remove said occluded fluids and evacuating said specimen to remove said solvent.

9. The method in accordance with claim 1 in which said gas of the group consisting of air, methane, carbon dioxide, hydrogen, and helium.

10. The apparatus for determining the permeability of a cylindrical porous specimen comprising a specimen holder, means for indicating the pressure in said specimen holder, valve-controlled conduit means connecting said specimen holder to a chamber adapted to obtain a gas at a pressure greater than the pressure in said specimen holder, and a substantially fluid-impermeable member adapted to be placed in said specimen holder, said fluid-impermeable member having substantially the same volume, and shape as said specimen means to record the pressure in said specimen holder at a plurality of instants during the expansion of said gas from said chamber.

11. The apparatus in accordance with claim 10 including means for engaging the flat ends of said specimen for supporting said specimen within said specimen holder in a fixed position.

12. The apparatus in accordance with claim 11 in which said support means is adapted to cover the flat ends of said specimen and seal same against fluid flow.

References Cited by the Examiner

UNITED STATES PATENTS

| | | | |
|---|---|---|---|
| 2,113,686 | 4/38 | Gift | 73—38 |
| 2,539,355 | 1/51 | Reichertz | 73—38 |
| 2,617,719 | 11/52 | Stewart | 73—38 |
| 2,633,015 | 3/53 | Morris | 73—38 |
| 2,729,969 | 1/56 | Innes | 73—38 |
| 3,073,149 | 1/63 | Mongan | 73—38 |

FOREIGN PATENTS 504,119  7/54  Canada.

OTHER REFERENCES

Article by A. E. Oaks titled "Helium Leak Testing Fuel Rods for the PWR Blanket," in Sept.–Oct. Nondestructive Testing (publication), pages 319 to 322.

ISAAC LISANN, *Primary Examiner.*